US006756095B2

(12) United States Patent
Sandt et al.

(10) Patent No.: US 6,756,095 B2
(45) Date of Patent: Jun. 29, 2004

(54) HEAT-SEALABLE LAMINATE

(75) Inventors: Richard L. Sandt, Brunswick, OH (US); Mark D. Kittel, Berea, OH (US); Henry Lum, Jr., Whittier, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/758,092

(22) Filed: Jan. 10, 2001

(65) Prior Publication Data

US 2002/0127361 A1 Sep. 12, 2002

(51) Int. Cl.⁷ .................................................. B32B 7/12
(52) U.S. Cl. ...................... 428/40.1; 283/81; 428/41.9; 428/42.1; 428/346; 428/347; 428/352; 428/353; 428/354; 428/355
(58) Field of Search ........................ 428/40.1, 41.9, 428/42.1, 346, 347, 352, 357, 353, 355; 783/81

(56) References Cited

U.S. PATENT DOCUMENTS

| | | | |
|---|---|---|---|
| 2,862,832 A | 12/1958 | Sheperd, Jr. ................ 117/3 |
| 2,882,599 A | 4/1959 | Martin ...................... 30/294 |
| 2,990,311 A | 6/1961 | Shepherd, Jr. ............. 154/95 |
| 3,043,732 A | 7/1962 | Shepherd, Jr. ............ 156/230 |
| 3,108,850 A | 10/1963 | Brandt ........................ 18/55 |
| 3,207,822 A | 9/1965 | Makowski ................. 264/94 |
| 3,231,419 A | 1/1966 | Korpman .................. 117/122 |
| 3,239,478 A | 3/1966 | Harlan, Jr. ................. 260/27 |
| 3,380,868 A | 4/1968 | Moser ...................... 156/229 |
| 3,484,976 A | 12/1969 | Shea ........................ 40/310 |
| 3,503,826 A | 3/1970 | Nasica ..................... 156/245 |
| 3,616,015 A | 10/1971 | Kingston .................. 156/230 |
| 3,625,752 A | 12/1971 | Korpman .................. 117/122 |
| 3,676,202 A | 7/1972 | Korpman .................. 117/122 |
| 3,723,170 A | 3/1973 | Korpman .................. 117/122 |
| 3,733,002 A | 5/1973 | Fujio ........................ 215/12 |
| 3,758,661 A | 9/1973 | Yamamoto ................ 264/230 |
| 3,783,072 A | 1/1974 | Korpman .................. 156/244 |
| 3,932,328 A | 1/1976 | Korpman .................. 260/27 |

(List continued on next page.)

FOREIGN PATENT DOCUMENTS

| | | |
|---|---|---|
| CA | 2044079 | 3/1992 |
| CA | 2012357 | 11/1999 |
| GB | 2 201 681 A | 7/1988 |
| JP | 2-217223 | 8/1990 |
| WO | 93/04842 | 3/1993 |

OTHER PUBLICATIONS

Avery Dennison Corporation, Description of Commercial Heat–Sealable Laminate sold by Avery Dennison prior to Jan. 10, 2000.

(List continued on next page.)

Primary Examiner—Nasser Ahmad
(74) Attorney, Agent, or Firm—Renner, Otto, Boisselle & Sklar, LLP

(57) ABSTRACT

This invention relates to a heat-sealable laminate, comprising: a facestock having an upper surface and a lower surface; a heat-activatable first adhesive layer underlying the lower surface of the facestock; and a second adhesive layer overlying the upper surface of the facestock, with the proviso that the laminate is characterized by the absence of either an adhesion promoting layer or an abrasion-resistant transparent coating layer positioned between the upper surface of the facestock and the second adhesive layer. These heat-sealable laminates may be used in providing pictorial and/or print designs or messages (e.g., labels, decals, etc.) that can be adhered to substrates (e.g., metal, plastic, leather, paper or textile substrates) such as automotive interior surfaces, hard plastic component parts, consumer durable goods, and the like.

43 Claims, 5 Drawing Sheets

U.S. PATENT DOCUMENTS

| | | |
|---|---|---|
| 3,940,001 A | 2/1976 | Haefner et al. ................. 215/1 |
| 3,959,908 A | 6/1976 | Lowe ........................... 40/301 |
| 4,028,292 A | 6/1977 | Korpman ..................... 260/27 |
| 4,081,309 A | 3/1978 | Jenkins ....................... 156/250 |
| 4,137,081 A | 1/1979 | Pohl .............................. 96/87 |
| 4,174,218 A | 11/1979 | Pohl ........................... 430/306 |
| 4,175,460 A | 11/1979 | McPhail ...................... 83/856 |
| 4,228,232 A | 10/1980 | Rousseau .................... 430/271 |
| 4,355,967 A | 10/1982 | Hellmer ...................... 425/503 |
| 4,359,314 A | 11/1982 | Hellmer ....................... 425/503 |
| 4,377,616 A | 3/1983 | Ashcraft et al. ............ 428/213 |
| D269,154 S | 5/1983 | Freedman et al. ............. D8/98 |
| 4,393,115 A | 7/1983 | Yoshii et al. ............... 428/323 |
| 4,398,985 A | 8/1983 | Eagon ......................... 156/233 |
| 4,406,411 A | 9/1983 | Gall et al. ................... 428/577 |
| 4,426,422 A | 1/1984 | Daniels |
| 4,456,934 A | 6/1984 | Wedman et al. .............. 360/78 |
| 4,479,770 A | 10/1984 | Slat et al. .................... 425/503 |
| 4,479,771 A | 10/1984 | Slat et al. .................... 425/503 |
| 4,501,797 A | 2/1985 | Super et al. ................. 428/349 |
| 4,501,798 A | 2/1985 | Koschak et al. ............ 428/349 |
| 4,528,055 A | 7/1985 | Hattemer .................... 156/247 |
| 4,528,221 A | 7/1985 | Komatsuzaki et al. ........ 428/35 |
| 4,544,590 A | 10/1985 | Egan ............................. 428/40 |
| 4,567,681 A | 2/1986 | Fumei ......................... 40/310 |
| 4,582,752 A | 4/1986 | Duncan ....................... 428/318 |
| 4,590,020 A | 5/1986 | Itaba et al. .................... 264/22 |
| 4,599,253 A | 7/1986 | Bree ............................. 428/40 |
| 4,601,926 A | 7/1986 | Jabarin et al. ................. 428/35 |
| 4,616,992 A | 10/1986 | Oles ............................ 425/503 |
| 4,626,455 A | 12/1986 | Karabedian ................. 428/35 |
| 4,639,207 A | 1/1987 | Slat et al. .................... 425/503 |
| 4,704,310 A | 11/1987 | Tighe et al. |
| 4,704,323 A | 11/1987 | Duncan et al. ............. 428/286 |
| 4,705,714 A | 11/1987 | Itaba et al. ................. 428/215 |
| 4,710,338 A | 12/1987 | Bagnall et al. ............. 264/509 |
| 4,713,273 A | 12/1987 | Freedman .................... 428/40 |
| 4,720,416 A | 1/1988 | Duncan ...................... 428/195 |
| 4,721,531 A | 1/1988 | Wildeman |
| 4,721,638 A | 1/1988 | Matsuguchi et al. .......... 428/40 |
| 4,729,864 A | 3/1988 | Chang et al. ............... 264/509 |
| 4,737,098 A | 4/1988 | Oles et al. ................... 425/503 |
| 4,746,556 A | 5/1988 | Matsuguchi et al. .......... 428/40 |
| 4,758,396 A | 7/1988 | Crass et al. .................. 264/145 |
| 4,762,737 A | 8/1988 | Lu ............................... 428/35 |
| 4,794,284 A | 12/1988 | Buon .......................... 310/12 |
| 4,808,366 A | 2/1989 | Kaminski et al. ........... 264/509 |
| 4,824,912 A | 4/1989 | Su .............................. 525/240 |
| 4,834,641 A | 5/1989 | Keyser ....................... 425/503 |
| 4,837,075 A | 6/1989 | Dudley ....................... 428/220 |
| 4,837,088 A | 6/1989 | Freedman .................. 156/243 |
| 4,855,187 A | 8/1989 | Osgood, Jr. et al. ........ 428/516 |
| 4,863,772 A | 9/1989 | Cross ........................... 428/40 |
| 4,870,122 A | 9/1989 | Lu .............................. 524/458 |
| 4,872,707 A | 10/1989 | deBruin ..................... 283/102 |
| 4,873,088 A | 10/1989 | Mayhew et al. ............ 424/450 |
| 4,883,697 A | 11/1989 | Dornbusch et al. ......... 428/36 |
| 4,886,698 A | 12/1989 | Purdy ......................... 428/213 |
| 4,892,689 A | 1/1990 | Van Cappellen et al. ..... 264/25 |
| 4,892,779 A | 1/1990 | Leatherman et al. ........ 428/220 |
| 4,894,259 A * | 1/1990 | Kuller .................... 427/208.8 |
| 4,904,324 A | 2/1990 | Heider ........................ 156/214 |
| 4,916,025 A | 4/1990 | Lu .............................. 428/516 |
| 4,917,592 A | 4/1990 | Pletzer et al. .............. 425/503 |
| 4,925,714 A | 5/1990 | Freedman .................... 428/40 |
| 4,935,300 A | 6/1990 | Parker et al. ............... 428/352 |
| 4,946,532 A | 8/1990 | Freeman .................... 156/243 |
| 4,953,313 A | 9/1990 | Scott ............................ 40/301 |
| 4,983,348 A | 1/1991 | Barresi et al. .............. 264/509 |
| 4,986,866 A | 1/1991 | Ohba et al. ................ 156/220 |
| 5,019,436 A | 5/1991 | Schramer et al. ............. 428/40 |
| 5,026,266 A | 6/1991 | Takasaki et al. ............ 425/150 |
| 5,026,592 A | 6/1991 | Janocha et al. ............. 428/204 |
| 5,032,344 A | 7/1991 | Kaminski ................... 264/509 |
| 5,042,842 A | 8/1991 | Green et al. ................ 283/101 |
| 5,073,435 A | 12/1991 | Eyraud et al. .............. 428/215 |
| 5,075,583 A | 12/1991 | Sakagami et al. ............ 310/12 |
| 5,076,977 A | 12/1991 | Maier et al. ................. 264/25 |
| 5,079,057 A | 1/1992 | Heider ......................... 428/36 |
| 5,104,719 A * | 4/1992 | Kamen ....................... 428/195 |
| 5,126,197 A | 6/1992 | Schinkel et al. ............ 428/349 |
| 5,152,946 A | 10/1992 | Gillette ....................... 264/230 |
| 5,186,782 A | 2/1993 | Freedman ................... 156/244 |
| 5,223,315 A | 6/1993 | Katsura et al. ............... 428/37 |
| 5,223,346 A | 6/1993 | Lu .............................. 428/516 |
| 5,242,650 A | 9/1993 | Rackovan et al. .......... 264/509 |
| 5,284,681 A | 2/1994 | Shinonaga et al. ......... 427/316 |
| 5,284,688 A | 2/1994 | Hiatt |
| 5,288,548 A | 2/1994 | Weber ........................ 428/316 |
| 5,308,693 A | 5/1994 | Ryle et al. .................. 428/307 |
| 5,332,542 A | 7/1994 | Yamanaka et al. .......... 264/509 |
| 5,366,796 A | 11/1994 | Murschall et al. .......... 428/216 |
| 5,405,667 A | 4/1995 | Heider ......................... 428/36 |
| 5,424,650 A | 6/1995 | Frick .......................... 324/688 |
| 5,435,963 A | 7/1995 | Rackovan et al. .......... 264/509 |
| 5,475,075 A | 12/1995 | Brant et al. ................. 526/348 |
| 5,495,944 A | 3/1996 | Lermer ....................... 206/459 |
| 5,552,451 A * | 9/1996 | Everaerts ..................... 522/46 |
| 5,562,962 A | 10/1996 | Tung .......................... 428/200 |
| 5,587,214 A | 12/1996 | Mitchell, Jr. ................. 428/40 |
| 5,595,810 A * | 1/1997 | Beinert ....................... 428/156 |
| 5,604,006 A | 2/1997 | Ponchaud et al. ............ 428/67 |
| 5,614,146 A | 3/1997 | Nakamura et al. .......... 264/511 |
| 5,658,629 A * | 8/1997 | Delcuve .................... 428/41.3 |
| 5,711,839 A | 1/1998 | Dronzek, Jr. ............... 156/277 |
| 5,725,261 A | 3/1998 | Rahn .......................... 292/307 |
| 5,725,962 A | 3/1998 | Bader et al. ................ 428/515 |
| 5,733,615 A | 3/1998 | Rackovan et al. |
| 5,876,816 A | 3/1999 | Freedman .................... 428/40 |
| 6,001,208 A | 12/1999 | Kinoshita et al. ........... 156/245 |
| 6,004,682 A | 12/1999 | Rackovan et al. .......... 428/518 |
| 6,146,744 A | 11/2000 | Freedman ................... 428/213 |
| 6,150,013 A | 11/2000 | Balaji et al. ................ 428/220 |
| 6,228,486 B1 * | 5/2001 | Kittel ......................... 428/354 |
| 6,294,236 B1 | 9/2001 | Freedman .................... 428/40 |
| 6,365,254 B1 * | 4/2002 | Zoller ...................... 428/40.1 |
| 6,461,722 B1 | 10/2002 | Kittel et al. ................. 428/195 |

OTHER PUBLICATIONS

International Search Report, International Application No. PCT/US01/49084, dated Apr. 18, 2002.

Water Ink Technologies, Inc., Technical Datasheet, X–Cel Water–Based Film Inks (Jan. 1, 1998).

SunChemical, Flexible Packaging, Product Information Sheet for Sun Sheen, Aug. 1990.

SunChemical, Product Information Sheet for SUNTEX MP, Date unknown.

Sun Chemical Corporation, Health and Safety Dept., Material Safety Data Sheet for CLA91598F–Multibond Black, Apr. 9, 1998.

Sun Chemical Corporation, Health and Safety Dept., Material Safety Data Sheet for CLB04275F–Prokote Primer, Apr. 9, 1998.

Sun Chemical, Product Information Sheet for Prokote Primer RLB00201 F/S, Date unknown.

Sun Chemical, Product Information Sheet for SunCure Clear Coating RCA01302R, date unknown.

Hostaphan Polyester Film, Product Bulletin, 4LD4 Solvent Adherable Film, 10/96.

Rad–Cure Corp., Technical Data Sheet for RAD–CURE UV1008, 1990.

Sun Chemical Corp., Health and Safety Dept., Material Safety Data Sheet for RCA01302R–UV Coating, Apr. 9, 1998.

Union Carbide Research Product Technical Bulletin, UCC Polypropylene WRD–1057 (1997).

Chevron Chemical Co., Technical Data Sheet, Ethylene–Methyl Acrylate Copolymer, EMCA, SP2268PT, Sep. 16, 1994.

Ampacet Product Information, Slip PE MB, date unknown.

Ampacet Product Information, Product 10061, Jul. 28, 1998.

A. Schulman Inc., Product Information Sheet for Polybatch F 20, Jan. 28, 1996.

A. Schulman Inc., Product Information Sheet for Polybatch PF 92 D, Jan. 29, 1996.

A. Schulman Inc., Product Information Sheet for Polybatch White P8555 SD, Mar. 5, 1996.

Material Safety Data Sheet, A.J. Daw Printing Ink Co., Inc., Product Uvilith AR–109 Rubine Red, Apr. 14, 1997.

Adhesion and Bond, Encyclopedia of Polymer Science and Engineering vol. 1, p. 476–546, Interscience Publishers, 2nd Ed. 1985.

* cited by examiner

HEAT-SEALABLE LAMINATE

TECHNICAL FIELD

This invention relates to heat-sealable laminates. These heat-sealable laminates may be used to provide pictorial and/or print designs or messages (e.g., labels, decals, etc.) that can be adhered to substrates (e.g., metal, plastic, leather, paper or textile substrates) such as automotive interior surfaces, hard plastic component parts, consumer durable goods, and other identification systems.

BACKGROUND OF THE INVENTION

Heat-sealable labels are used in automotive interiors to provide instructional and/or warning labels on seat belts, visors, dashboards, and the like. A typical construction for these labels is illustrated in FIG. 1. Referring to FIG. 1, label 100 has a paper carrier 110 and a release coating 120 adhered to one side of the paper carrier 110. Ink or graphics layer 130 is adhered to the release coating 120 and heat-activatable adhesive layer 140 is adhered to ink or graphics layer 130. The label 100 is placed on substrate 150 (e.g., seat belt, visor, etc.) with the adhesive layer 140 in contact with the substrate 150. Heat and pressure are applied to the label 100 through the paper carrier 110 to heat seal the label 100 to the substrate 150. The paper carrier 110 is then removed from the heat-sealed label. The release coating 120 separates with the paper carrier 110. The ink or graphics layer 130 and adhesive layer 140 remain adhered to the substrate 150.

These prior art heat-sealable labels have a number of disadvantages. These include the fact that the ink or graphics layer 130 cannot be seen through the paper carrier 110 during the application of label 100 to the substrate 150. This can result in an imprecise placement of the ink or graphics layer 130 on the substrate 150. The ink or graphics layer 130 as applied to the substrate 150 tends to conform to the surface contours of the substrate 150 and when the surface is not smooth, (e.g., when the substrate 150 is a foam-backed polyester automotive interior material) the pictorial design and/or print message provided by the ink or graphics layer often appears to be fuzzy or out of focus. Once applied to the substrate 150, the ink or graphics layer 130 tends to have poor chemical resistance and durability (e.g., poor abrasion resistance) characteristics, and poor opacity.

SUMMARY OF THE INVENTION

This invention relates to a heat-sealable laminate, comprising: a facestock having an upper surface and a lower surface; a heat-activatable first adhesive layer underlying the lower surface of the facestock; and a second adhesive layer overlying the upper surface of the facestock; with the proviso that the laminate is characterized by the absence of either an adhesion promoting layer or an abrasion-resistant transparent coating layer positioned between the upper surface of the facestock and the second adhesive layer.

In one embodiment, the inventive laminate further comprises an adhesion promoting layer positioned between the upper surface of the facestock and the second adhesive layer.

In one embodiment, the inventive laminate further comprises an abrasion-resistant transparent coating layer positioned between the upper surface of the facestock and the second adhesive layer.

In one embodiment, the inventive laminate further comprises an ink or graphics layer positioned between the upper surface of the facestock and the second adhesive layer.

In one embodiment, the heat-activatable first adhesive layer is adhered to the lower surface of the facestock and the inventive laminate further comprises an ink or graphics layer adhered to the heat-activatable first adhesive layer on the side of the heat-activatable first adhesive layer that is opposite the side of the heat-activatable first adhesive layer that is in contact with the facestock.

In one embodiment, the inventive laminate further comprises an ink or graphics layer positioned between the lower surface of the facestock and the heat-activatable first adhesive layer.

In one embodiment, the heat-activatable first adhesive layer is adhered to the lower surface of the facestock and the inventive laminate further comprises an ink or graphics layer positioned between the upper surface of the facestock and the second adhesive layer, and another ink or graphics layer adhered to the heat-activatable first adhesive layer on the side of the heat-activatable first adhesive layer that is opposite the side of the heat-activatable first adhesive layer that is in contact with the facestock.

In one embodiment, the inventive laminate further comprises a carrier sheet overlying the second adhesive layer.

In one embodiment, the inventive laminate further comprises an ink or graphics layer overlying the upper surface of the facestock and an adhesion promoting layer positioned between the ink or graphics layer and the upper surface of the facestock.

In one embodiment, the inventive laminate further comprises an ink or graphics layer overlying the upper surface of the facestock and an abrasion-resistant transparent coating layer positioned between the ink or graphics layer and the second adhesive layer.

In one embodiment, the inventive laminate further comprises a transparent film layer having an upper surface and a lower surface, and another adhesive layer adhered to the lower surface of the transparent film layer, the another adhesive layer being positioned between the transparent film layer and the upper surface of the facestock.

In one embodiment, the inventive laminate is adhered to a substrate.

These heat-sealable laminates may be used to provide pictorial and/or print designs or messages (e.g., labels, decals, etc.) that can be adhered to substrates (e.g., metal, plastic, leather, paper or textile substrates) such as automotive interior surfaces (e.g., seat belts, visors, dashboards, headrests, seat-backs, door panels, headliners, carpet, flooring, seat covers, etc.), hard plastic component parts (e.g., appliance parts, motor fluid caps, engine housings, etc.), consumer durable goods (e.g., helmets, vacuum cleaners, sports equipment, etc.), other identification systems (e.g., livestock tags, lock box tags, etc.), and the like.

BRIEF DESCRIPTION OF THE DRAWINGS

In the annexed drawings, like references indicate like parts or features.

DESCRIPTION OF THE PREFERRED EMBODIMENTS

The term "overlies" and cognate terms such as "overlying" and the like, when referring to the relationship of one or a first layer relative to another or a second layer, refers to the fact that the first layer partially or completely lies over the second layer. The first layer overlying the second layer may or may not be in contact with the second layer. For example, one or more additional layers may be positioned between the first layer and the second layer. The term "underlies" and cognate terms such as "underlying" and the like have similar meanings except that the first layer partially or completely lies under, rather than over, the second layer.

The term "transparent" when referring to one or more layers overlying the ink or graphics layer(s) of the inventive heat-sealable laminate means that the ink or graphics layer (s) can be seen through such layer or layers.

The term "abrasion-resistant transparent coating layer" refers to a transparent coating layer that may be included with or excluded from the inventive heat-sealable laminate and when included provides protection against abrasions that would be expected during the normal use and handling of the laminate.

The term "adhesion promoting layer" refers to a coating layer that may be included with or excluded from the inventive heat-sealable laminate and when included is made from a radiation-curable, solvent-based or water-based primer and positioned between two layers for the purpose of increasing the adhesion between such layers.

The term "primer" refers to a coating composition comprised of a lacquer dissolved in a diluent.

The term "lacquer" refers to a film-forming material that is dissolved in a diluent.

Figure 1:
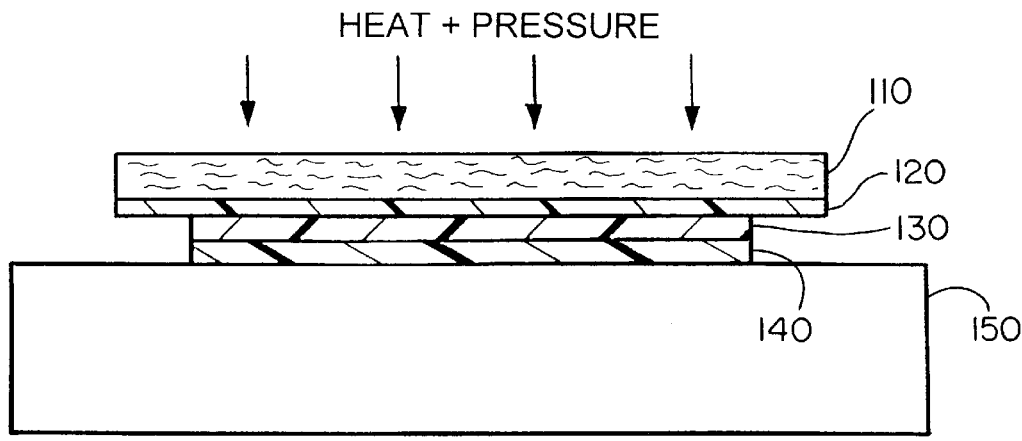
FIG. 1 is a schematic illustration of the side of a prior art label, the label being heat sealed to a substrate.
Figure 2:
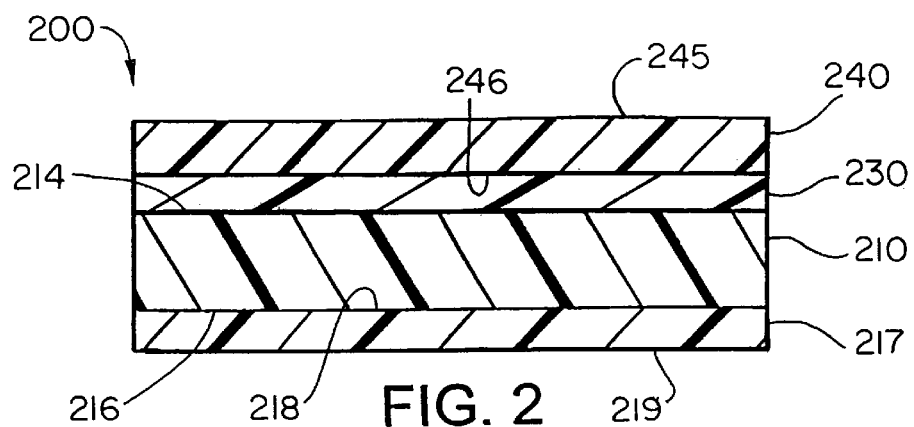
FIG. 2 is a schematic illustration of the side view of a heat-sealable laminate embodying the present invention in a particular form.

Referring to FIG. 2, the inventive heat-sealable laminate, in one of its illustrated embodiments, is generally indicated by the reference numeral 200, and is comprised of: a facestock 210 which has an upper surface 214 and a lower surface 216; a heat-activatable first adhesive layer 217 underlying and adhered to surface 216; a second adhesive layer 230 overlying and adhered to the upper surface 214; and a carrier sheet 240 adhered to the second adhesive layer 230. The upper surface 214 of facestock 210 may be a printable surface. The heat-activatable first adhesive layer 217 has an upper side or surface 218 in contact with the lower surface 216 of facestock 210, and a lower side or surface 219 that is opposite the side or surface 218 that is in contact with the facestock. Surface 219 may be a printable surface. The underside 246 of carrier sheet 240 is in contact with the second adhesive layer 230. The upper surface 245 of carrier sheet 240 optionally may have a release coating layer adhered to it.

Figure 3:
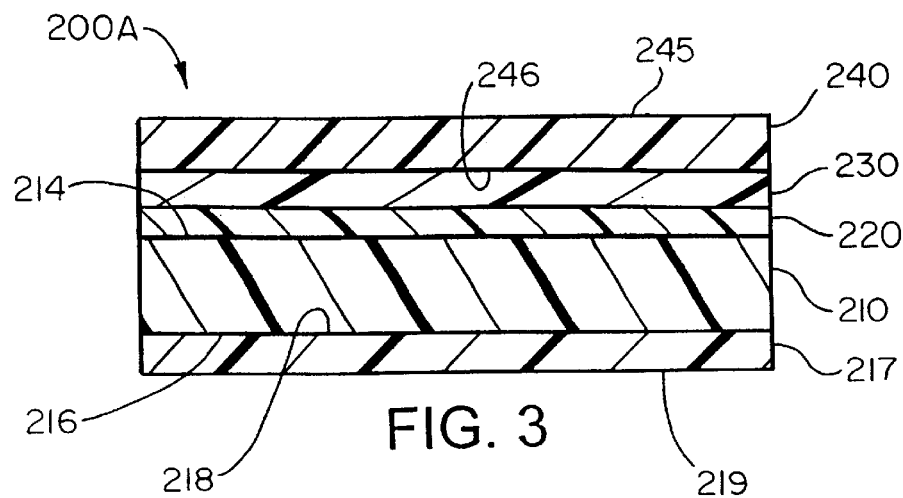
FIG. 3 is a schematic illustration of the side view of an alternative embodiment of the heat-sealable laminate of the present invention.

The heat-sealable laminate 200A depicted in FIG. 3 is identical to the heat-sealable laminate 200 depicted in FIG. 2, with the exception that the heat-sealable laminate 200A includes an ink or graphics layer 220 positioned between the upper surface 214 and the second adhesive layer 230. In all other respects the laminates 200 and 200A are the same.

Figure 4:
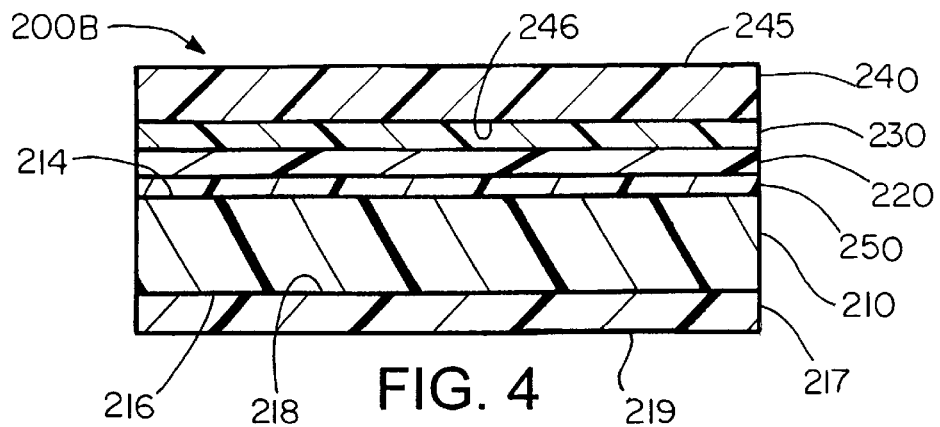
FIG. 4 is a schematic illustration of the side view of still another embodiment of the heat-sealable laminate of the present invention.

The heat-sealable laminate 200B depicted in FIG. 4 is identical to the heat-sealable laminate 200A depicted in FIG. 3, with the exception that the heat-sealable laminate 200B includes an adhesion-promoting layer 250 positioned between the upper surface 214 and the ink or graphics layer 220. In all other respects the laminates 200A and 200B are the same.

Figure 5:
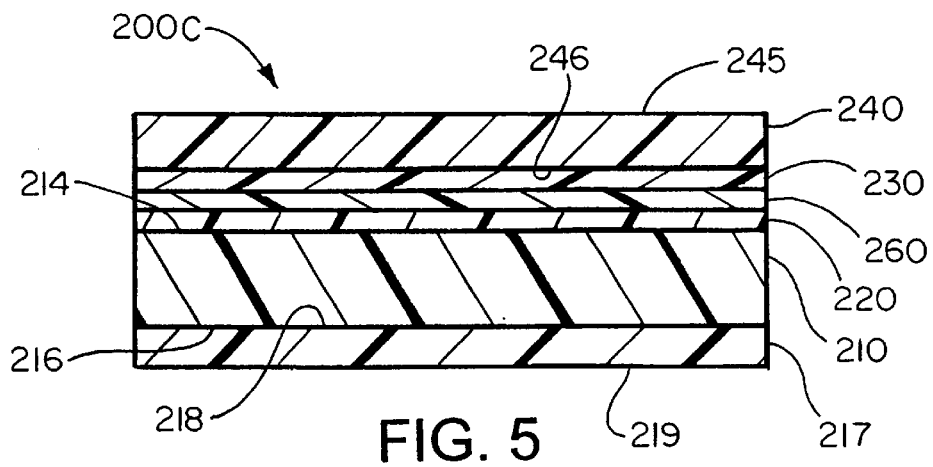
FIG. 5 is a schematic illustration of the side view of still another embodiment of the heat-sealable laminate of the present invention.

The heat-sealable laminate 200C depicted in FIG. 5 is identical to the heat-sealable laminate 200A depicted in FIG. 3, with the exception that the heat-sealable laminate 200C includes an abrasion-resistant transparent coating layer 260 positioned between the ink or graphics layer 220 and the second adhesive layer 230. In all other respects the laminates 200A and 200C are the same.

Figure 6:
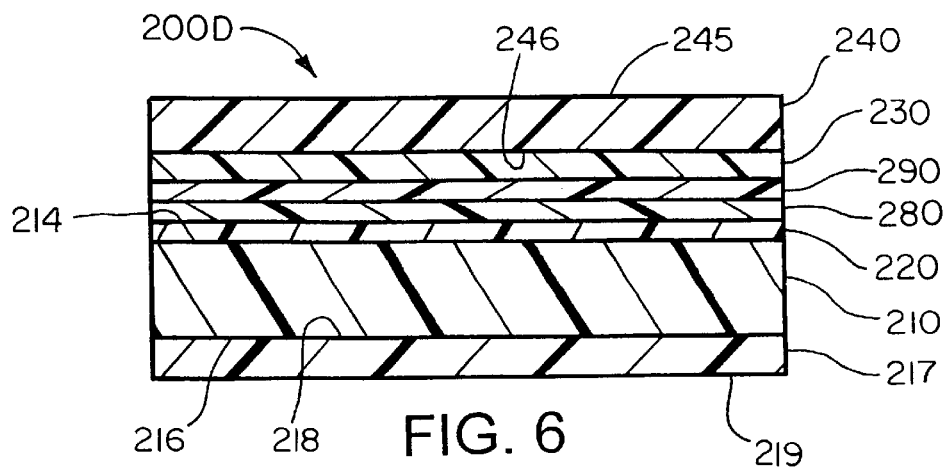
FIG. 6 is a schematic illustration of the side view of still another embodiment of the heat-sealable laminate of the present invention.

The heat-sealable laminate 200D depicted in FIG. 6 is identical to the heat-sealable laminate 200A depicted in FIG. 3, with the exception that the heat-sealable laminate 200D includes a transparent film layer 290 underlying second adhesive layer 230 and an adhesive layer 280 positioned between the ink or graphics layer 220 and the transparent film layer 290. In all other respects the laminates 200A and 200D are the same.

Figure 7:
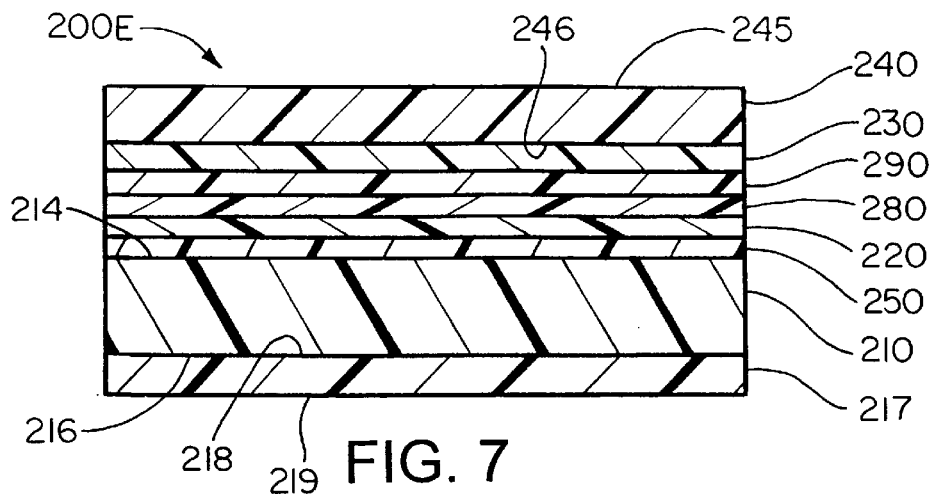
FIG. 7 is a schematic illustration of the side view of still another embodiment of the heat-sealable laminate of the present invention.

The heat-sealable laminate 200E depicted in FIG. 7 is identical to the heat-sealable laminate 200A depicted in FIG. 3, with the exception that the heat-sealable laminate 200E includes an adhesion-promoting layer 250 positioned between the upper surface 214 and the ink or graphics layer 220, a transparent film layer 290 underlying and in contact with the second adhesive layer 230, and an adhesive layer 280 positioned between the ink or graphics layer 220 and the transparent film layer 290. In all other respects the laminates 200A and 200E are the same.

Figure 8:
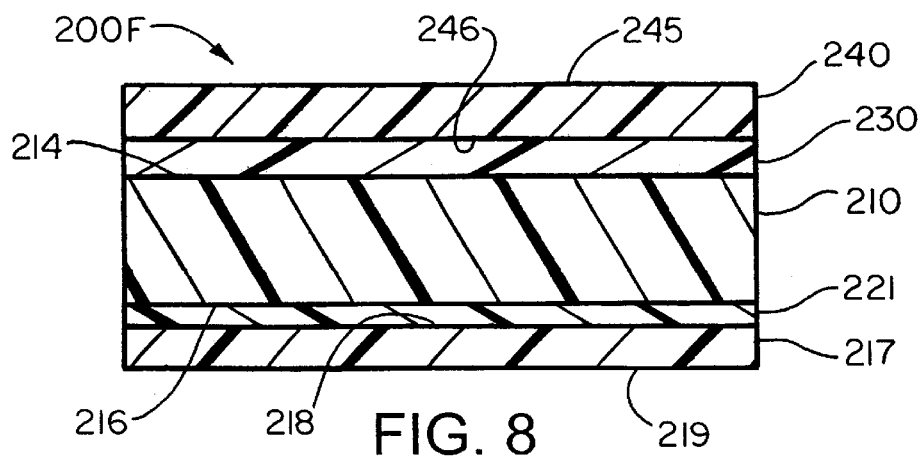
FIG. 8 is a schematic illustration of the side view of still another embodiment of the heat-sealable laminate of the present invention.

The heat-sealable laminate 200F depicted in FIG. 8 is identical to the heat-sealable laminate 200 depicted in FIG. 2, with the exception that the heat-sealable laminate 200F includes ink or graphics layer 221 positioned between lower surface 216 and heat-activatable first adhesive layer 217. Facestock 210 in heat-sealable laminate 200F is transparent.

Figure 9:
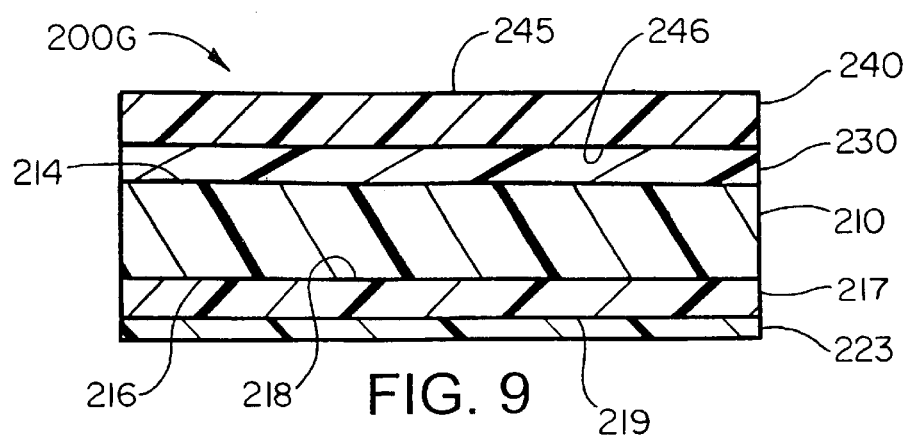
FIG. 9 is a schematic illustration of the side view of still another embodiment of the heat-sealable laminate of the present invention.

The heat-sealable laminate 200G depicted in FIG. 9 is identical to the heat-sealable laminate 200 depicted in FIG. 2, with the exception that the heat-sealable laminate 200G includes ink or graphics layer 223 underlying and adhered to lower surface 219. Facestock 210 in heat-sealable laminate 200G is transparent.

Figure 10:
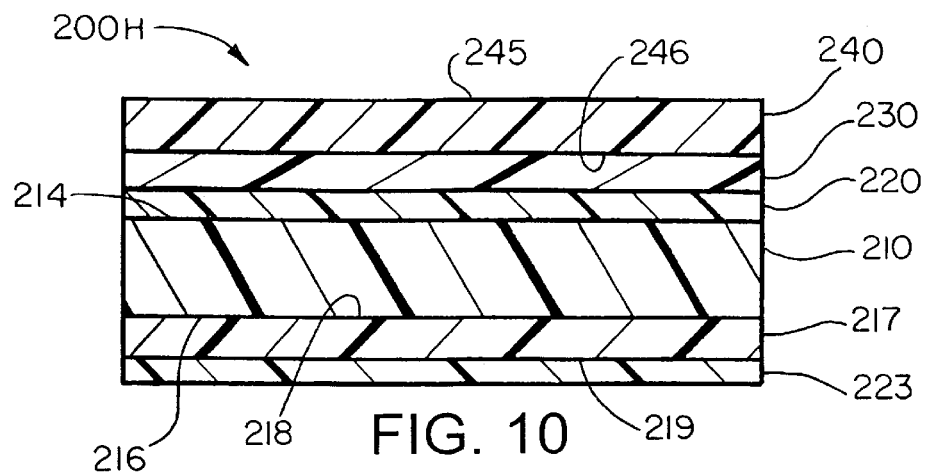
FIG. 10 is a schematic illustration of the side view of still another embodiment of the heat-sealable laminate of the present invention.

The heat-sealable laminate 200H depicted in FIG. 10 is identical to the heat-sealable laminate 200A depicted in FIG. 3, with the exception that the heat-sealable laminate 200H includes ink or graphics layer 223 underlying and adhered to lower surface 219. Facestock 210 in heat-sealable laminate 200H is transparent. In this embodiment, the print and/or coloring of the two ink or graphics layers 220 and 223 should be coordinated so that the overlying layer 220 does not block the desired visible features in the underlying layer 223.

In each of the foregoing embodiments, any layer, including the facestock 210, that overlies the ink or graphics layers 220, 221 and/or 223 should be transparent so that the ink or graphics layers may be viewed through such facestock and layers.

In one embodiment, the upper surface 214 may be corona treated to raise the surface energy of the surface to allow for enhanced printing on it. Also, in one embodiment, the lower surface 216 may be corona treated to enhance the adhesion between the lower surface 216 and the adhesive layer 217. Corona treating involves discharging up to about 10,000 volts of electricity from a ceramic electrode to a ground roll over which the film is passing. This high voltage field called "corona" alters the surface of the film. Treating the surface of the film raises the surface energy of the film (measured in terms of dyne level) and allows for enhanced printing.

The facestock 210 may have overall thickness of about 1 to about 25 mils, and in one embodiment about 1 to about 20 mils, and in one embodiment about 1 to about 15 mils, and in one embodiment about 1 to about 10 mils, and in one embodiment about 2 to about 7 mils, and in one embodiment about 3 to about 5 mils. The thickness of heat-activatable adhesive layers 218 and 330 may range from about 0.1 to about 10 mils, and in one embodiment about 0.1 to about 5 mils, and in one embodiment about 0.3 to about 2 mils.

The facestock 210 may be comprised of metal foil, polymer film, paper sheet, or combinations thereof. The facestock may be comprised of textile including woven and non-woven fabrics made of natural or synthetic fibers. The facestock may be a single-layered construction or it may be a multi-layered construction. These include polymeric films and multi-layered polymeric films. The multi-layered constructions have two or more layers, and in one embodiment about two to about nine layers, and in one embodiment about two to about seven layers, and in one embodiment about three to about five layers. The layers of such multi-layered constructions may have the same composition and/or size or they may be different.

The metal foils include foils of such metals as copper, gold, silver, tin, chromium, zinc, nickel, platinum, palladium, iron, aluminum, steel, lead, brass, bronze, and alloys of the foregoing metals. Examples of such alloys include copper/zinc, copper/silver, copper/tin/zinc, copper/phosphorus, chromium/molybdenum, nickel/chromium, nickel/phosphorous, and the like. The metal foils can be used by themselves or they can be joined or adhered to a polymeric sheet or film to form a multi-layered laminate or construction.

The polymer films include polyolefins (linear or branched), polyamides, polystyrenes, nylon, polyesters, polyester copolymers, polyurethanes, polysulfones, styrene-maleic anhydride copolymers, styrene-acrylonitrile copolymers, ionomers based on sodium or zinc salts of ethylene methacrylic acid, polymethyl methacrylates, cellulosics, acrylic polymers and copolymers, polycarbonates, polyacrylonitriles, and ethylene-vinyl acetate copolymers. Included in this group are the acrylates such as ethylene methacrylic acid, ethylene methyl acrylate, ethylene acrylic acid and ethylene ethyl acrylate. Also, included in this group are polymers and copolymers of olefin monomers having, for example, 2 to about 12 carbon atoms, and in one embodiment 2 to about 8 carbon atoms. These include the polymers of α-olefins having from 2 to about 4 carbon atoms per molecule. These include polyethylene, polypropylene, poly-1-butene, etc. An example of a copolymer within the above definition is a copolymer of ethylene with 1-butene having from about 1 to about 10 weight percent of the 1-butene comonomer incorporated into the copolymer molecule. The polyethylenes that are useful have various densities including low, medium and high density ranges. The low density range is from about 0.910 to about 0.925 g/cm$^3$; the medium density range is from about 0.925 to about 0.940 g/cm$^3$; and the high density range is from about 0.940 to about 0.965 g/cm$^3$. An example of a commercially available material that is useful is available from Du Pont under the trade designation Mylar LB; this material is identified as being a biaxially oriented polyester film. Films prepared from blends of copolymers or blends of copolymers with homopolymers also are useful. The films may be extruded as monolayered films or multi-layered films. The films may be oriented films or nonoriented films.

The paper sheets include paper, clay coated paper, glassine, paperboard from straw, bark, wood, cotton, flax, cornstalks, sugarcane, bagasse, bamboo, hemp, and similar cellulose materials prepared by such processes as the soda, sulfite or sulfate (Kraft) processes, the neutral sulfide cooking process, alkali-chlorine processes, nitric acid processes, semi-chemical processes, etc. Although paper of any basis weight can be employed, paper having basis weights in the range of from about 20 to about 150 pounds per ream (lb/ream) are useful, and papers having weights in the range of from about 30 to about 60 lb/ream can be used.

The facestock 210 may be comprised of a polymer-coated paper which is basically a sheet of paper that is coated on either one or both sides with a polymer coating. The polymer coating, which may be comprised of a high, medium, or low density polyethylene, polypropylene, polyester, and other similar polymer films, is coated on the paper surface to add strength and/or dimensional stability. The weight of these types of coated paper facestocks can vary over a wide range with weights in the range of about 5 to about 50 lb/ream being useful. In total, the final coated paper facestock may be comprised of between about 10% and about 40% by weight polymer. For two-sided coatings, the quantity of polymer is usually approximately evenly divided between the top and bottom surface of the paper.

The facestock 210 may be transparent or it may be pigmented. The pigments that can be used include titanium dioxide, both rutile and anatase crystal structure. In one embodiment, the pigment is added to the facestock material in the form of a concentrate containing the pigment and a resin carrier. The concentrate may contain, for example, about 20% to about 80% by weight pigment, and about 20% to about 80% by weight resin carrier. The resin carrier can be any thermoplastic polymer having a melting point in the range of about 100° C. to about 265° C. Examples include polyethylene, polypropylene, polybutylene, polyester, nylon and the like. In one embodiment, a titanium dioxide concentrate is used which is comprised of a blend of about 30% to about 70% by weight polypropylene and about 70% to about 30% by weight titanium dioxide. An example of a commercially available pigment concentrate that can be used is available from A. Schulman Inc. under the tradename PolyBatch White P8555 SD, which is identified as a white color concentrate having a coated rutile titanium dioxide concentration of 50% by weight in a polypropylene homopolymer carrier resin. Another example is Ampacet 110233 which is a product of Ampacet Corporation identified as a $TiO_2$ concentrate containing 50% rutile $TiO_2$ and 50% low density polyethylene. The concentration of pigment in the facestock 210 can be up to about 25% by weight, and when used is generally in the range of about 5% to about 25% by weight, and in one embodiment about 10% to about 20% by weight.

The facestock 210 may include a filler material to increase opacity. The fillers that can be used include calcium carbonate and talc. In one embodiment, the filler is added in the form of a concentrate containing the filler and a resin carrier. The concentrate may contain, for example, about 20% to about 80% by weight filler, and about 20% to about 80% by weight resin carrier. The resin carrier can be any thermoplastic polymer having a melting point in the range of about 100° C. to about 265° C. Examples include polyethylene, polypropylene, polybutylene, polyester, nylon, and the like. Also included are thermoplastic copolymers such as ethylene methylacrylate, and the like. In one embodiment, a calcium carbonate concentrate is used which is comprised of a blend of about 50% to about 80% by weight polypropylene and about 20% to about 50% by weight calcium carbonate. An example of a commercially available pigment concentrate that can be used is available from A. Schulman Inc. under the tradename PF 920, which is identified as a calcium carbonate concentrate having a calcium carbonate concentration of 40% by weight in a polypropylene homopolymer carrier resin. Another example is Ampacet 101087 which is a product of Ampacet Corporation identified as a calcium carbonate concentrate containing 30% by weight calcium carbonate and 70% by weight ethylene methylacrylate. The concentration of filler in the facestock may be up to about 40% by weight, and when used is generally in the range of about 10% to about 40% by weigh, and in one embodiment about 10% to about 35% by weight.

The heat-activatable first adhesive layer 217 may be made from any heat-activatable adhesive or thermoplastic film material. These include polyolefins (linear or branched), polyamides such as nylon, polyester copolymers, ionomers based on sodium or zinc salts of ethylene methacrylic acid, polyacrylonitriles, and ethylene-vinyl acetate copolymers. Included in this group are the acrylates such as ethylene methacrylic acid, ethylene methyl acrylate, ethylene acrylic acid and ethylene ethyl acrylate. Also, included in this group are polymers and copolymers of olefin monomers having, for example, 2 to about 12 carbon atoms, and in one embodiment 2 to about 8 carbon atoms. These include the polymers of α-olefins having from 2 to about 4 carbon atoms per molecule. These include polyethylene, polypropylene, poly-1-butene, etc. An example of a copolymer within the above definition is a copolymer of ethylene with 1-butene having from about 1 to about 10 weight percent of the 1-butene comonomer incorporated into the copolymer molecule. The polyolefins include amorphous polyolefins. The polyethylenes that are useful have various densities including low, medium and high density ranges as defined above. The ethylene/methyl acrylate copolymers available from Chevron under the tradename EMAC can be used. These include EMAC 2260, which has a methyl acrylate content of 24% by weight and a melt index of 2.0 grams/10 minutes @ 190° C., 2.16 Kg; and EMAC SP 2268T, which also has a methyl acrylate content of 24% by weight and a melt index of 10 grams/10 minutes @190° C., 2.16 Kg. Polymer film materials prepared from blends of copolymers or blends of copolymers with homopolymers are also useful.

The heat-activatable first adhesive layer 217 generally has a lower melting point than any of the other layers used in the laminates 200, 200A, 200B, 200C, 200D, 200E, 200F, 200G or 200H to permit the layer 217 to function as a heat-activatable adhesive. Typically, the melting point, as determined by differential scanning colorimetry at second heat cycle, of the heat-activatable adhesive layer 217 is in the range of about 50° C. to about 150° C., and in one embodiment about 70° C. to about 85° C. The melting point of the heat-activatable adhesive layer 217 is typically at least about 10° C. lower than the melting point of the facestock 210, and in one embodiment about 10° C. to about 90° C., and in one embodiment about 30° C. to about 90° C., and in one embodiment it is about 86° C. lower. In embodiments wherein the inventive laminate is to be bonded to a rough or porous substrate (e.g., a woven fabric) it is advantageous that the heat-activatable first adhesive layer 217 be relatively thick and that the difference between the melting point of the heat-activatable first adhesive layer 217 and the melting point of the facestock 210 be relatively high. This provides the inventive heat-sealable laminate with the advantage of preventing or reducing the rough or porous surface of the substrate from showing through the laminate to provide a clear and precise pictorial design and/or print message rather than a fuzzy or out-of-focus looking image.

The facestock 210 and/or adhesive layer 217 may contain one or more slip additives. These include primary amides such as stearamide, behenamide, oleamide, erucamide, and the like; secondary amides such as stearyl erucamide, erucyl erucamide, oleyl palmitamide, stearyl stearamide, erucyl stearamide, and the like; ethylene bisamides such as N,N'-ethylenebisstearamide, N,N'-ethylenebisolemide and the like; and combinations of any two or more of the foregoing amides. An example of a useful slip additive is available from Ampacet under the trade designation 10061; this product is identified as a concentrate containing 6% by weight of a stearamide slip additive. The slip additive may be used at a concentration in the range of up to about 4% by weight, and in one embodiment about 0.05% to about 2% by weight, and in one embodiment about 0.1% to about 0.5% by weight.

The facestock 210 and/or adhesive layer 217 may contain one or more antiblock additives. These include natural silica, diatomaceous earth, synthetic silica, glass spheres, ceramic particles, calcium carbonate particles, calcium silicate particles, fatty amide particles, aluminum silicate, and the like. Examples of commercially available antiblock additives include those available from A. Schulman under the trade designation CABL 4040 which is identified as solid pellets containing 5% silicate, 5% ceramic microspheres and the remainder being a low density polyethylene. Schulman AB5, which is an antiblock concentrate available from A. Schulman which comprises 5% solid synthetic amorphous silica in 95% low density polyethylene, can also be used. Polybatch F-20, which is available from A. Schulman and is identified as concentrate containing 20% natural silica based in low density polyethylene, can be used. Other useful additives include those available from Zeelan Industries under the trade designation Zeeospheres; 3M under the trade designation Scotchlite Glass Bubbles; Potters Industries under the trade designation Spheriglass; Mo-Sci Corporation under the trade designation Precision Glass Spheres (Class IV); Huber under the trade designation Huber Q; Nyco Minerals under the trade designations Nycor, Nyad, Ultrafibe, Primglos, Nyglos and Wallastocoat; Jayco under the trade designation Dragonite; Witco under the trade designation Kenamide; and U.S. Silica under the trade designation Min-U-Sil. The antiblock additive may be used at a concentration of up to about 20% by weight, and in one embodiment about 0.1% to about 10% by weight, and in one embodiment about 0.5% to about 5% by weight.

The antiblock and slip additives may be added together in the form of a resin concentrate. An example of such a concentrate is available from DuPont under the tradename Elvax CE9619-1. This resin concentrate contains 20% by weight silica, 7% by weight of an amide slip additive, and 73% by weight of Elvax 3170 (a product of DuPont identified as an ethylene/vinyl acetate copolymer having a vinyl acetate content of 18% by weight). The amount of antiblock and slip additives may be the same or different in each layer. Generally it is desireable to minimize the amount of these additives to avoid ink adhesion and low heat seal bond problems. However, a sufficient amount to prevent blocking of self wound rolls of film is usually desirable.

The facestock 210 and/or adhesive layer 217 may contain a minor amount of an adhesive material to enhance the adhesion of the facestock 210 and adhesive layer 217 to each other. Also, or alternatively, a tie layer of an adhesive resin may be positioned between the facestock 210 and adhesive layer 217 to enhance adhesion. The adhesive material may be comprised of an adhesive resin such as ethylene/vinyl acetate copolymer. These include DuPont Elvax 3170 and 3190LG. The adhesive resins available from DuPont under the tradename Bynel can also be used. The adhesive material may be used at a concentration of up to about 100% by weight, and in one embodiment about 45% to about 85% by weight of the facestock 210 and/or adhesive layer 217. When used in the form of a film layer or layers between the facestock 210 and adhesive layer 217, each of such adhesive resin film layer or layers may have a thickness of about 5% to about 40% of the thickness of the facestock 210, and in one embodiment about 10% to about 25%.

The facestock 210 and/or adhesive layer 217 may contain ultraviolet (UV) light absorbers or other light stabilizers. These additives are included to prevent degradation due to sunlight. One useful type of stabilizer is a hindered amine light stabilizer. Hindered amine light stabilizers are described in the literature such as in U.S. Pat. No. 4,721,531, columns 4 to 9, which are incorporated herein by reference. The hindered amine light stabilizers may, for example, be derivatives of 2,2,6,6-tetraalkyl piperidines or substituted piperizinediones. A number of hindered amine light stabilizers useful in the invention are available commercially such as from Ciba-Geigy Corporation under the general trade designations "Tinuvin" and "Chemassorb", and from Cytec under the general designation "Cyasorb-UV." Examples include Tinuvin 111 which is identified as a mixture of 1,3,5-Triazine-2,4,6-triamine, N,N'''-[1,2-ethanediylbis[[[4,6-bis[butyl(1,2,2,6,6-pentamethyl-4-piperidinyl)amino]-1,3,5-triazin-2-yl]imino]-3,1propanediyl]]-bis[N',N''-dibutyl-N',N''-bis(1,2,2,6,6-pentamethyl-4-piperidinyl)-and dimethyl succinate polymer with 4-hydroxy-2,2,6,6,-tetramethyl-1-piperidineethanol; Tinuvin 123 which is identified as bis-(1-octyloxy-2,2,6,6-tetramethyl-4-piperidinyl) sebacate; Tinuvin 770 which is identified as bis-(2,2,6,6-tetramethyl-4-piperidinyl)-sebacate; Tinuvin 765 which is identified as bis-(1,2,2,6,6-pentamethyl-4-piperidinyl)-sebacate; Tinuvin 622 which is a dimethyl succinate polymer with 4-hydroxy-2,2,6,6,-tetramethyl-1-piperidineethanol; and Chemassorb 944 which is poly[[6-(1,1,3,3-tetramethylbutyl) amino]-1,3,5-triazine-2,4-diyl][[2,2,6,6-tetramethyl-4-piperidyl)imino]] hexamethylene (2,2,6,6-tetramethyl-4-piperidyl)imino]], and Chemassorb 119 which is identified as being 1,3,5-Triazine-2,4,6-triamine-N',N''-[1,2-ethanediylbis[[[4.6-bis[butyl(1,2,2,6,6-pentamethyl-4-peperidinyl)amino]-1,3,5-triazin-2-yl]imino]-3,1 propanediyl]]-bis[N',N''-dibutyl-N',N''-bis (1,2,2,6,6-pentamethyl-4-piperidinyl)-. UV light absorbers include those available from Ciba-Geigy under the Tinuvin name and Great Lakes Chemical Corporation under the trade designation "Lowilite." Examples include: Tinuvin P, which is identified as 2-(2'-hydroxy-5'-methylphenyl)-benzotriazole; Tinuvin 326, which is identified as 2-(3'-tert-butyl-2'-hydroxy-5'methylphenyl)-5-chlorobenzotriazole; Tinuvin 238, which is identified as 2-(2'hydroxy-3',5'-di-tert-amylphenyl) benzotriazole; Lowilite 20, which is identified as 2-hydroxy-4-methoxy-benzophenone; Lowilite 22, which is identified as 2-hydroxy-4-n-octoxy-benzophenone; and Lowilite 1200, which is identified as 2-hydroxy-4-n-dodecyloxy-benzophenone. A useful stabilizer is available under the tradename Ampacet 10561 which is a product of Ampacet identified as a UV stabilizer concentrate containing 20% by weight of a UV stabilizer and 80% by weight of a low density polyethylene carrier resin. The concentration of UV absorber or light stabilizer may be up to about 2.5% by weight, and in one embodiment may be about 0.05% to about 1% by weight.

The facestock 210 and the adhesive layer 217 may be formed by simultaneous extrusion from two or more extruders and a suitable coextrusion die whereby the facestock 210 and adhesive layer 217 are adhered to each other in a permanently combined state to provide a unitary coextrudate. As indicated above, a tie layer or layers of an adhesive resin may be used and such tie layer or layers may be coextruded with the facestock 210 and adhesive layer 217. Alternatively, a coating process may be used to lay down one or more of the layers of the facestock 210 as well as the adhesive layer 217 onto a moving web. These processes are well known in the art.

The ink or graphics layers 220, 221 and/or 223 may be mono-colored or multi-colored ink layers, depending on the printed message and/or pictorial design intended for the heat-sealable laminate. These include variable imprinted data such as serial numbers, bar codes, and the like. The thickness of each ink or graphics layer may range from about 0.5 to about 25 microns, and in one embodiment about 0.5 to about 10 microns, and in one embodiment about 0.5 to about 5 microns, and in one embodiment about 1 to about 4 microns, and in one embodiment about 3 microns. The inks used in the ink or graphics layers 220, 221 and/or 223 may be commercially available water-based, solvent-based or radiation-curable, especially UV curable, inks appropriately chosen for the particular construction of the thermal transfer laminate and/or the particular printing method used. Examples include Sun Sheen (a product of Sun Chemical identified as an alcohol dilutable polyamide ink), Suntex MP (a product of Sun Chemical identified as a solvent-based ink formulated for surface printing acrylic coated substrates, PVDC coated substrates and polyolefin films), X-Cel (a product of Water Ink Technologies identified as a water-based film ink for printing film substrates), Uvilith AR-109 Rubine Red (a product of Daw Ink identified as a UV ink) and CLA91598F (a product of Sun Chemical identified as a multibond black solvent-based ink).

The adhesion-promoting layer 250, which may be included with or excluded from the inventive laminate, is made from a radiation-curable, solvent-based or water-based primer. The adhesion-promoting layer is positioned between two other layers (e.g., two coating layers, one coating layer and one film layer, etc.) and increases adhesion between the two layers. The adhesion-promoting layer 250 may be transparent. The material used to form the adhesion promoting layer is comprised of a lacquer dissolved in a diluent. The lacquer is comprised of one or more polyolefins, polyamides, polyesters, polyester copolymers, polyurethanes, polysulfones, polyvinylidine chloride, styrene-maleic anhydride copolymers, styrene-acrylonitrile copolymers, ionomers based on sodium or zinc salts or ethylene methacrylic acid, polymethyl methacrylates, acrylic polymers and copolymers, polycarbonates, polyacrylonitriles, ethylene-vinyl acetate copolymers, and mixtures of two or more thereof. Examples of the diluents that can be used include ethanol, isopropanol, butanol, ethyl acetate, propyl acetate, butyl acetate, toluene, xylene, acetone, methyl ethyl ketone, heptane, and mixtures thereof. The ratio of lacquer to diluent is dependent on the viscosity required for application of the adhesion-promoting layer, the selection of such viscosity being within the skill of the art. Examples of the adhesion-promoting layer materials that can be used include CLB04275F—Prokote Primer (a product of Sun Chemical Corporation identified as a solvent based primer). The adhesion-promoting layer 250 may have thicknesses in the range of about 1 to about 4 microns, and in one embodiment about 1.5 to about 3 microns, and in one embodiment about 2 microns.

The abrasion-resistant transparent coating layer 260, which may be included with or excluded from the inventive laminate, may be made from any solvent-based, water-based or radiation-curable coating material designed to provide abrasion resistance and optionally enhanced gloss. In one embodiment, this coating layer reduces the bond strength of the second adhesive layer 230 which facilitates removal of the carrier sheet 240. In one embodiment, this coating layer provides the inventive heat sealable laminate with fire retardant properties. This coating layer may be made from UV curable oligomers such as epoxies, urethanes, polyesters, acrylics, and the like. These are cured by free-radicals generated by photoinitiators after exposure to UV light. Reactive diluents such as hexanediol diacrylate, pentaerythritol, tetraacrylate, N-vinylpyrrolidinone, and the like, can be used to control viscosity of the coating before cure and to modify the crosslink density. Epoxy resins and alkyl vinyl ethers, which are cationically cured, can also be used. Reactive diluents such as vinyl ethers, limonene dioxide, glycidyl ether, and the like, can be used. The coating may also contain wetting agents, leveling agents, waxes, slip aids, and light stabilizers. A commercially available coating material that can be used is RCA01302R-UV Coating which is available from Sun Chemical. Another commercially available coating material that can be used is FireCure AX 3464 which is available from Daw Ink. This coating layer typically has a thickness of about 1 to about 4 microns, and in one embodiment about 1 to about 3 microns, and in one embodiment about 2 microns.

The adhesive layer 230 may be comprised of any removable pressure-sensitive adhesive material, or radiation-curable, especially UV curable, adhesive material suitable for coating a film substrate. When the adhesive layer 230 is a radiation-curable adhesive layer it is transparent. When the adhesive layer 230 is a removable pressure sensitive adhesive layer, it is preferably (but not necessarily) transparent. The radiation-curable adhesive materials may be made from compositions containing multifunctional acrylate monomers and oligomers. Acrylated urethanes and acrylated acrylics are useful. The radiation-curable adhesives may include photoinitiators and optionally surfactants to provide a uniform flow resulting in an even coating. An example of a commercially available adhesive material that can be used is Rad-Cure UV 1008 (a product of Rad-Cure Corporation identified as a UV-curable, solvent-free adhesive containing 70–95% by weight multifunctional acrylate monomers and oligomers, 5–20% by weight photoinitiator and 0–5% by weight surfactants).

The removable pressure-sensitive adhesive can be any removable pressure sensitive adhesive known in the art for use with film substrates. The term "removable" is used herein to refer to an adhesive that can adhere to the carrier sheet 240 and the layer underlying it without edge lifting and can be removed without damaging either sheet 240 or the underlying layer. The removable adhesive layer 230 is preferentially adherent to carrier sheet 240 and thus separates from the layer underlying it with carrier sheet 240 when the carrier sheet 240 is removed. The removable pressure-sensitive adhesives that can be used are known in the art and include rubber based adhesives, acrylic adhesives, vinyl ether adhesives, silicone adhesives, and mixtures of two or more thereof. The adhesives may be hot melt, solvent-based or water based adhesives. Included are the pressure sensitive materials described in "Adhesion and Bond", *Encyclopedia of Polymer Science and Engineering*, Vol. 1, pages 476–546, Interscience Publishers, $2^{nd}$ Ed. 1985, the disclosure of which is hereby incorporated by reference. The pressure sensitive adhesive materials that are useful may contain as a major constituent an adhesive polymer such as acrylic-type polymers; block copolymers; natural, reclaimed, or styrene-butadiene rubbers; tackified natural or synthetic rubbers; or random copolymers of ethylene and vinyl acetate, ethylene-vinyl-acrylic terpolymers, polyisobutylene, poly (vinyl ether), etc. Other materials may be included in the pressure sensitive adhesive such as tackifying resins, plasticizers, antioxidants, fillers, pigments, waxes, etc.

The adhesive layer 230 has a thickness that is typically in the range of about 0.5 to about 5 microns, and in one embodiment about 1 to about 4 microns, and in one embodiment about 1.5 to about 2 microns.

Each of the layers 220, 221, 223, 230, 250 and/or 260 (and/or the optional release coating applied to upper surface 245) may be applied and cured using known techniques. The application techniques include gravure, reverse gravure, offset gravure, roll coating, brushing, knife-over roll, metering rod, reverse roll coating, doctor knife, dipping, die coating, spraying, curtain coating, flexographic, letter press, rotary screen, flat screen, and the like. The applied coating layers may be cured by exposure to heat or to known forms of ionizing or actinic non-ionizing radiation. Curing temperatures that may be used may range from about 40° C. to about 260° C., and in one embodiment about 40° C. to about 175° C., and in one embodiment about 40° C. to about 100° C., and in one embodiment about 40° C. to about 60° C. Useful types of radiation include ultraviolet light, electron beam, x-ray, gamma-ray, beta-ray, etc. Ultraviolet light is especially useful. The equipment for generating these forms of thermal cure or radiation cure are well known to those skilled in the art.

The transparent film layer 290 may be made from any of the polymeric film materials described above as being useful for making the facestock 210. Polyolefin and especially polyester film materials are useful. The transparent film layer 290 may have a thickness of about 0.25 to about 5 mils, and in one embodiment about 0.5 to about 10 mils, and in one embodiment about 0.5 to about 5 mils, and in one embodiment about 0.5 to about 2 mils, and in one embodiment about 1 mil.

The adhesive layer 280 may be comprised of any of the radiation curable or pressure sensitive adhesives described above. Pressure sensitive adhesives are especially useful. The adhesive layer 280 may have a thickness of about 0.1 to about 3 mils, and in one embodiment about 0.3 to about 1.5 mils, and in one embodiment about 0.5 to about 1 mil.

The film layer 290 may be placed in contact with the adhesive layer 280 using known techniques. When the adhesive 280 is a radiation-curable adhesive, the film layer 290 may be placed in contact with the adhesive layer 280 prior to curing the adhesive layer. The adhesive layer is then cured. When the adhesive layer 280 is pressure-sensitive adhesive, it may be initially applied to the film layer 290 and then the film layer 290 with applied adhesive is adhered to the layer underlying it. Alternatively, the pressure-sensitive adhesive may be applied to the underlying layer, and then the film layer 290 is placed in contact with the adhesive to adhere the film layer 290 to the underlying layer.

The carrier sheet 240 may be placed in contact with the adhesive layer 230 using known techniques. When the adhesive 230 is a radiation-curable adhesive, the carrier sheet 240 may be placed in contact with the adhesive layer 230 prior to curing the adhesive layer. The adhesive layer is then cured. When the adhesive layer 230 is pressure-sensitive adhesive, it may be initially applied to the carrier sheet 240, and then the carrier sheet with applied adhesive is adhered to the layer underlying it. Alternatively, the pressure-sensitive adhesive may be applied to the underlying layer, and then the carrier sheet 240 is placed in contact with the adhesive to adhere the carrier sheet 240 to the underlying layer. The carrier sheet 240 may be comprised of paper, polymer film, or a combination thereof. Any of the paper or polymer films, or combinations thereof, discussed above as being useful as the facestock 210 may be used as the carrier sheet 240. It is advantageous, however, that the carrier sheet 240 be transparent to permit visibility of the ink or graphics layers 220, 221 and/or 223 through the carrier sheet 240 (as well as through the other layers positioned between the carrier sheet 240 and the ink or graphics layers 220, 221 and/or 223). The outer surface 245 of the carrier sheet 240 may have a release coating adhered to it to facilitate rolling and unrolling of the inventive heat-sealable laminate. Any release coating known in art may be used. Silicone release coatings are useful. A commercially available polyester film that is useful as the carrier sheet 240 is Douglas Hanson E19506 (a product of Douglas Hanson identified as a clear polyester film having a release coating layer adhered to one side). Untreated polyester film can be used. The carrier sheet 240 typically has a thickness of about 0.25 to about 10 mils, and in one embodiment about 0.5 to about 5 mils, and in one embodiment about 2 mils. In one embodiment, the carrier sheet 240 is a polyester film having a thickness of about 0.25 to about 10 mils. In one embodiment, the carrier sheet 240 is a polyolefin film having a thickness of about 0.5 to about 5 mils. In one embodiment, the carrier sheet 240 is a paper sheet having a thickness of about 1 to about 10 mils.

Figure 11:
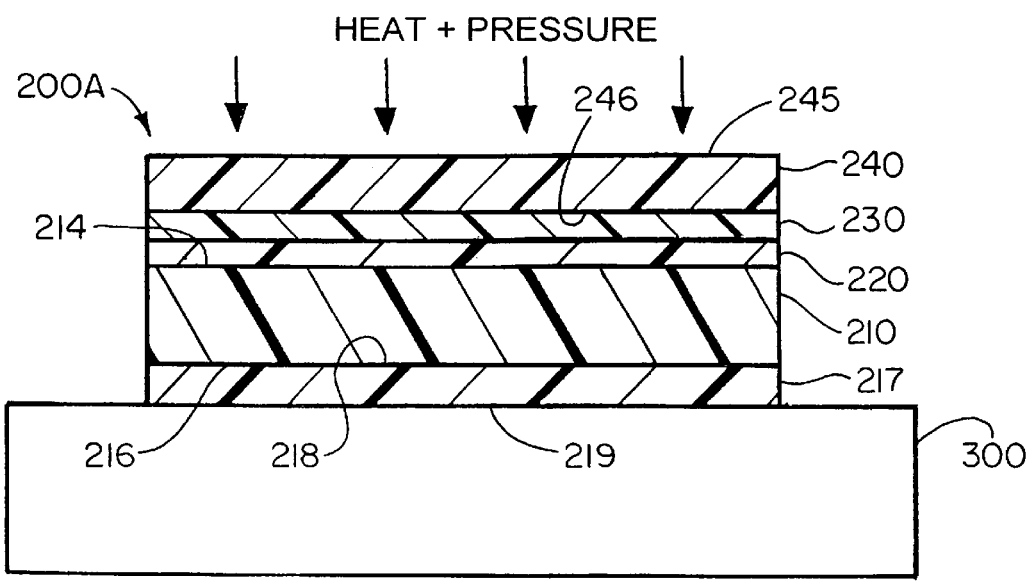
FIG. 11 is a schematic illustration showing the heat-sealable laminate of FIG. 3 being adhered to a substrate.

The inventive heat-sealable laminate may be adhered to any substrate using heat-sealing techniques known in the art. Referring to FIG. 11, the heat-sealable laminate 200A is placed on substrate 300 with the surface 219 of heat-activatable adhesive layer 217 in contact with the substrate 300. Heat and pressure are applied to the laminate 200A by a heated platen in contact with the carrier sheet 240. The heat passes through the laminate 200A to the heat-activatable adhesive layer 217 and softens or melts the heat-activatable adhesive layer 217. The heat and pressure are removed, and the heat-activatable adhesive layer 217 cools and solidifies resulting in the formation of a heat-sealed bond between the laminate 200A and the substrate 300. The heat and pressure that are applied are sufficient to soften or melt the heat-activatable adhesive layer 217. Temperatures in the range of about 100° C. to about 300° C., and in one embodiment about 150° C. to about 250° C., and in one embodiment about 180° C. to about 210° C., may be used. Pressures in the range of about 2 to about 20 psi, and in one embodiment about 8 to about 12 psi, may be used. Dwell times of about 0.5 to about 60 seconds, and in one embodiment about 0.5 to 20 seconds, and in one embodiment about 0.5 to about 10 seconds may be used. Any heat-sealing press used for heat-sealing labels tapes, decals, and the like to substrates may be used. These are well known in the art.

Figure 13:
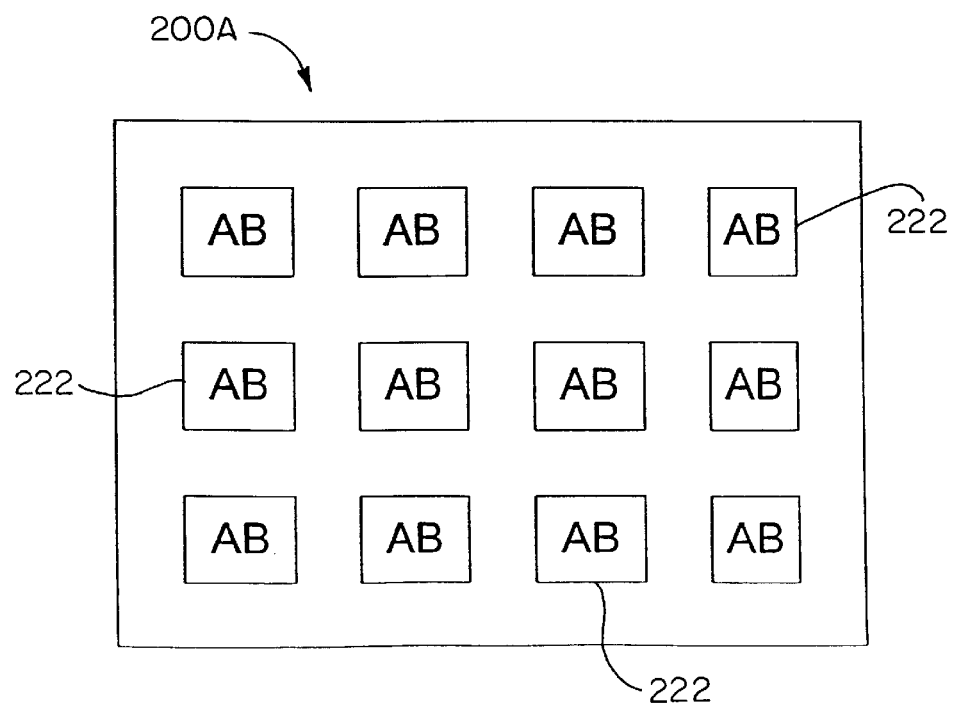
FIG. 13 is a schematic illustration of a plan view of the heat-sealable laminate of FIG. 3, with an array of printed messages formed in the ink or graphics layer of the laminate.

Referring to FIG. 13, a plurality or an array of individual images 222 can be formed in the ink or graphics layer 220 of the heat-sealable laminate 200A (or any of the other illustrated heat-sealable laminates). In embodiments wherein the carrier sheet 240 is transparent, the images 222 can be viewed from the top (as illustrated in FIG. 3) of the inventive heat-sealable laminate structure. These individual images 222 can be die cut to form separate heat-sealable labels.

Figure 12:
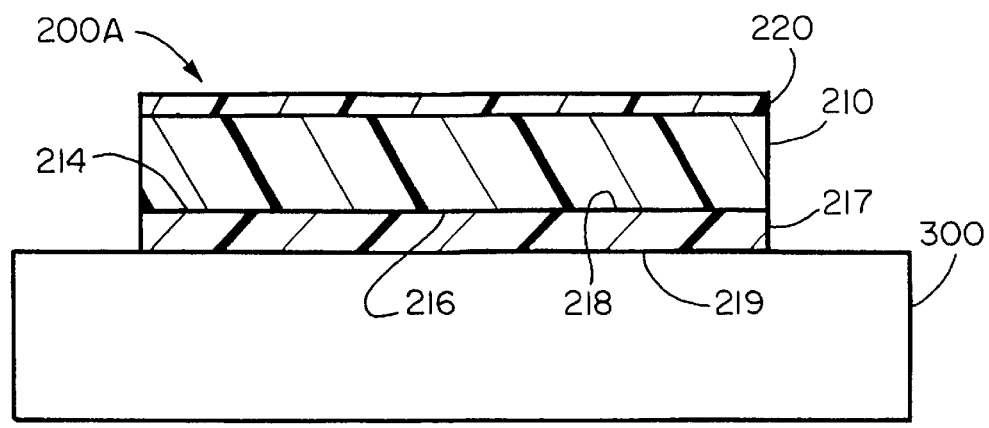
FIG. 12 is a schematic illustration showing the heat-sealable laminate of FIG. 3 adhered to a substrate with the carrier sheet and second adhesive layer of the laminate removed.

The substrate 300 may be any substrate material suitable for receiving a heat-sealable laminate. The substrate 300 may be made of metal, plastic, leather, paper, and the like. The substrate 300 may be made of a textile material such as a woven or non-woven fabric made of natural or synthetic materials. The substrate 300 may comprise an automotive interior surface (e.g., seat belt, visor, dashboard, headrest, seat-back, door panel, headliner, carpet, flooring, seat cover, etc.), a hard plastic component part (e.g., appliance part, motor fluid cap, engine housing, etc.), a consumer durable good (e.g., helmet, vacuum cleaner, sports equipment, etc.), other identification system (e.g., livestock tag, lock box tag, etc.), and the like. Upon application of the inventive heat-sealable laminate to the substrate 300, the carrier sheet 240 is removed using known removal or stripping techniques. When the adhesive layer 230 is a removable pressure-sensitive adhesive, it is removed using known techniques. This is illustrated in FIG. 12. When the adhesive layer 230 is a radiation-cured adhesive layer, it remains adhered to the layer underlying it and functions as an additional protective layer.

Example 1

Part A:

Heat-sealable laminate 200A (FIG. 3) is prepared using a coextruded polymeric film as the facestock 210. The facestock 210 has a thermoplastic core layer and an upper thermoplastic film layer adhered to upper surface of the core layer. Heat-activatable first adhesive layer 217 is coextruded with the facestock 210 and is adhered to lower surface of the core layer. The overall thickness of the facestock 210 and the adhesive layer 217 is 3.5 mils. The ratio of the thicknesses of the upper thermoplastic film layer to the core layer to the heat-activatable first adhesive film layer is 10:60:30. The core layer has the following composition (all percentages being by weight):

| | |
|---|---|
| A. Schulman Polybatch PF92D | 35% |
| A. Schulman Polybatch White P8555 SD | 35% |
| Union Carbide WRD5-1057 | 23% |
| Ampacet 10561 | 5% |
| Ampacet 10061 | 2% |

The upper thermoplastic film layer has the following composition:

| | |
|---|---|
| Union Carbide WRD5-1057 | 47% |
| UE 631-04 | 46% |
| A. Schulman F-20 | 2% |
| Ampacet 10561 | 5% |

The heat-activatable first adhesive layer 217 has the following composition:

| | |
|---|---|
| Chevron EMAC SP 2268T | 83% |
| A. Schulman F20 | 10% |
| Ampacet 10561 | 5% |
| Ampacet 10061 | 2% |

The upper surface of the upper thermoplastic film layer is corona treated. A multi-colored ink or graphics layer 220 providing a pictorial design in combination with a printed message is applied over the corona treated upper surface. The layer 220 is applied using a sequence of three anilox rolls. The following inks are used:

Roll 1: Yellow 116 ink (a UV curable ink provided by Daw Ink)
Roll 2: Red 186 ink (a UV curable ink provided by Daw Ink)
Roll 3: Black ink (a UV curable black ink provided by Werneke Ink)

Each ink application is UV cured prior to the application of the next ink application. The layer 220 has a thickness of 3 microns.

An adhesive layer 230 is applied over the layer 220 using an anilox roll. The adhesive layer material is Rad-Cure UV 1008. The adhesive layer 230 has a thickness of 2 microns.

A polyester film carrier sheet 240 having a thickness of 2 mils is adhered to the adhesive layer 230. The adhesive layer 230 is then UV cured to complete the fabrication of the heat-sealable laminate 200A. The polyester film that is used is provided by Douglas Hanson under the trade designation E 19506. This is a polyester film having a release coating layer on one of its sides. The underside 246 of the polyester film carrier sheet 240 is in contact with the UV-cured adhesive layer 230. The upper surface 245 of carrier sheet 240 is the side with the release coating.

Each ink application as well as the UV cured adhesive layer are cured using a medium pressure mercury bulb, an arc length of 45 cm, 500 watts per inch, a dichromatic reflector and a line speed of 65 feet per minute. The ink applications are cured using 50% power. The adhesive layer is cured using 100% power.

Part B:

The heat-sealable laminate 200A from Part A is placed on a substrate 300. The substrate 300 is a foam-backed polyester upholstery material used for automotive interiors. The heat-activatable first adhesive layer 217 is in contact with the substrate 300. The resulting composite is placed in a heated press. Heat and pressure are applied to the composite by a heated platen in contact with the polyester film carrier sheet 240. The temperature is 196° C. and the pressure is 9.1 psi. The dwell time is 2.5 seconds. The heat and pressure are sufficient to soften or melt the heat-activatable adhesive layer 217. Upon cooling, the heat-activatable adhesive layer 217 forms a bond adhering the heat-sealable laminate 200A to the substrate 300. The composite is removed from the press with the result being the heat-sealable laminate 200A being heat-sealed to the substrate 300. The polyester film carrier sheet 240 is removed leaving the remainder of the laminate 200A adhered to the substrate 300. The multi-colored pictorial design formed in the ink or graphics layer 220 is visible.

Example 2

Part A:

Heat-sealable laminate 200B (FIG. 4) is prepared using the facestock 210 used in Example 1. The upper surface of the upper thermoplastic film layer is corona treated. An adhesion promoting layer 250 is applied to the corona treated upper surface using an anilox roll. The adhesion promoting material is CLBO-4275F—Prokote Primer. The adhesion promoting material is cured in an oven at a temperature of 40–50° C. Adhesion promoting layer 250 has a thickness of 2 microns.

A multi-colored ink or graphics layer 220 providing a pictorial design in combination with a printed message is applied over the adhesion promoting layer 250. The ink or graphics layer 220 is applied using a sequence of three anilox rolls. The following inks are used:

Roll 1: Yellow 116 ink (a UV curable ink provided by Daw Ink)
Roll 2: Red 186 ink (a UV curable ink provided by Daw Ink)
Roll 3: Black ink (a UV curable black ink provided by Werneke Ink)

Each ink application is UV cured prior to the application of the next ink application. The ink or graphics layer 220 has a thickness of 3 microns.

An adhesive layer 230 is applied over the ink or graphics layer 220 using an anilox roll. The adhesive layer material is Rad-Cure UV 1008. The adhesive layer 230 has a thickness of 2 microns.

The polyester film carrier sheet 240 used in Example 1 is adhered to the adhesive layer. The adhesive layer 230 is then UV cured. The side 246 of the polyester film 240 opposite the side 245 with the release coating layer is in contact with the UV-cured adhesive layer 230.

Each ink application as well as the adhesion promoting layer and the UV cured adhesive layer are cured using a medium pressure mercury bulb, an arc length of 45 cm, 500 watts per inch, a dichromatic reflector and a line speed of 65 feet per minute. The ink applications and the adhesion promoting layer are cured using 50% power. The adhesive layer is cured using 100% power.

Part B:

The heat-sealable laminate 200B from Part A is adhered to a substrate 300. The substrate is a seat belt material designed for use in automotives. The laminate 200B is applied to the substrate 300 following the procedure described in Part B of Example 1 with the result being the heat sealing of the laminate 200B to the seat belt material. The polyester film carrier sheet 240 is removed leaving the remainder of the laminate 200B adhered to the seat belt material. The multi-colored pictorial design formed in the ink or graphics layer 220 is visible.

Example 3

Part A:

Heat-sealable laminate 200C (FIG. 5) is prepared using the facestock 210 used in Example 1. The upper surface of the upper thermoplastic film layer is corona treated. A multi-colored ink or graphics layer 220 providing a pictorial design in combination with a printed message is applied over the corona treated surface. The ink or graphics layer 220 is applied using a sequence of three anilox rolls. The following inks are used:

Roll 1: Yellow 116 ink (a UV curable ink provided by Daw Ink)

Roll 2: Red 186 ink (a UV curable ink provided by Daw Ink)

Roll 3: Black ink (a UV curable black ink provided by Werneke Ink)

Each ink application is UV cured prior to the application of the next ink application. The ink or graphics layer 220 has a thickness of 3 microns.

An abrasion-resistant transparent coating layer 260 is applied over the ink or graphics layer 220 using an anilox roll. The abrasion-resistant transparent coating layer material is RCA01302R-UV Coating. The abrasion-resistant transparent coating layer 260 has a thickness of 2 microns and is UV cured.

An adhesive layer 230 is applied over the abrasion-resistant transparent coating layer 260 using an anilox roll. The adhesive layer material is Rad-Cure UV 1008. The adhesive layer 230 has a thickness of 2 microns.

The polyester film carrier sheet 240 used in Example 1 is adhered to the adhesive layer 230. The adhesive layer is then UV cured. The side 246 of the polyester film 240 is in contact with the UV-cured adhesive layer 230. The other side of the polyester film has the release coating adhered to its surface.

Each ink application as well as the abrasion-resistant transparent coating layer, and the UV cured adhesive layer are cured using a medium pressure mercury bulb, an arc length of 45 cm, 500 watts per inch, a dichromatic reflector and a line speed of 65 feet per minute. The ink applications and abrasion-resistant transparent coating layer are cured using 50% power The adhesive layer is cured using 100% power.

Part B:

The heat-sealable laminate 200C from Part A is adhered to a hard plastic surface following the procedure described in Part B of Example 1 with the result being the heat sealing of the laminate 200C to the hard plastic surface. The polyester film carrier sheet 240 is removed leaving the remainder of the laminate 200C adhered to the hard plastic surface. The multi-colored pictorial design formed in the ink or graphics layer 220 is visible The inventive heat-sealable laminates have a number of advantages over the prior art. These include the fact that in embodiments wherein the carrier sheet 240 is transparent, the ink or graphics layer can be seen during application of the laminate to a substrate. This feature allows for precise placement of the ink or graphics layer on the substrate. Because of the presence of the facestock 210, the ink or graphics layers 220, 221 and/or 223 as applied to the substrate 300 do not conform to minor surface contours or imperfections in the substrate 300. Thus, the pictorial design and/or print message provided by the ink or graphics layer 220, 221 and/or 223 is clear and precise, and has good opacity characteristics. Once applied to the substrate 300, the ink or graphics layers 220, 221 and/or 223 of the inventive heat-sealable laminate, in one embodiment, are protected and thus have good chemical resistance characteristics and durability.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A heat-sealable laminate, comprising:
   a facestock having an upper surface and a lower surface;
   a heat-activatable first adhesive layer underlying the lower surface of the facestock; and
   a second adhesive layer overlying the upper surface of the facestock;
   with the proviso that the laminate is characterized by the absence of either an adhesion promoting layer or an abrasion-resistant transparent coating layer positioned between the upper surface of the facestock and the second adhesive layer,
   wherein the second adhesive layer is comprised of a radiation-cured adhesive material or a removable pressure-sensitive adhesive material.

2. The laminate of claim 1 wherein the laminate further comprises an adhesion promoting layer positioned between the upper surface of the facestock and the second adhesive layer.

3. The laminate of claim 1 wherein the laminate further comprises an abrasion-resistant transparent coating layer positioned between the upper surface of the facestock and the second adhesive layer.

4. The laminate of claim 1 wherein the laminate further comprises an ink or graphics layer positioned between the upper surface of the facestock and the second adhesive layer.

5. The laminate of claim 1 wherein the heat-activatable first adhesive layer is adhered to the lower surface of the facestock and the laminate further comprises an ink or graphics layer adhered to the heat-activatable first adhesive layer on the side of the heat-activatable first adhesive layer that is opposite the side of the heat-activatable first adhesive layer that is in contact with the facestock.

6. The laminate of claim 1 wherein the laminate further comprises an ink or graphics layer positioned between the lower surface of the facestock and the heat-activatable first adhesive layer.

7. The laminate of claim 1 wherein the heat-activatable first adhesive layer is adhered to the lower surface of the facestock and the laminate further comprises an ink or graphics layer positioned between the upper surface of the facestock and the second adhesive layer, and another ink or graphics layer adhered to the heat-activatable first adhesive layer on the side of the heat-activatable first adhesive layer that is opposite the side of the heat-activatable first adhesive layer that is in contact with the facestock.

8. The laminate of claim 1 wherein a carrier sheet overlies the second adhesive layer.

9. The laminate of claim 1 wherein the laminate further comprises an ink or graphics layer overlying the upper surface of the facestock and an adhesion promoting layer positioned between the ink or graphics layer and the upper surface of the facestock.

10. The laminate of claim 1 wherein the laminate further comprises an ink or graphics layer overlying the upper surface of the facestock and an abrasion-resistant transparent coating layer positioned between the ink or graphics layer and the second adhesive layer.

11. The laminate of claim 1 wherein the laminate is adhered to a substrate.

12. The laminate of claim 1 wherein the upper surface of the facestock is corona treated.

13. The laminate of claim 1 wherein the facestock comprises a single-layered construction.

14. The laminate of claim 1 wherein the facestock comprises a multi-layered construction.

15. The laminate of claim 1 wherein the facestock comprises foil, paper, polymer film, textile, or a combination thereof.

16. The laminate of claim 1 wherein the facestock is comprised of a polymeric film.

17. The laminate of claim 1 wherein the facestock is comprised of a multi-layered polymeric film.

18. The laminate of claim 1 wherein the facestock is comprised of a coextrudate.

19. The laminate of claim 1 wherein the facestock comprises a core layer having an upper surface and a lower surface, and the heat-activatable first adhesive layer is a thermoplastic film layer underlying the lower surface of the core layer, the facestock further comprising an upper thermoplastic film layer overlying the upper surface of the core layer.

20. The laminate of claim 19 wherein the upper thermoplastic film layer is comprised of a thermoplastic polymeric material selected from the group consisting of polyolefins, polyesters, polyamides, acrylic polymers, polystyrenes, polyurethanes, polycarbonates, polyacrylonitriles, ethylene-propylene copolymers, and mixtures of two or more thereof.

21. The laminate of claim 1 wherein the heat-activatable first adhesive layer is comprised of a heat-activatable adhesive or thermoplastic film material selected from the group consisting of polyolefins, polyamides, polyester copolymers, ionomers based on sodium or zinc salts of ethylene methacrylic acid, polyacrylonitriles, ethylene-vinyl acetate copolymers, ethylene methacrylic acid, ethylene methyl acrylate, ethylene acrylic acid, ethylene ethyl acrylate, and mixtures of two or more thereof.

22. The laminate of claim 1 wherein the facestock is comprised of a thermoplastic polymeric material selected from the group consisting of polyolefins, polyamides, polyesters, polyester copolymers, polyurethanes, polysulfones, styrene-maleic anhydride copolymers, styrene-acrylonitrile copolymers, ionomers based on sodium or zinc salts of ethylene methacrylic acid, polymethyl methacrylates, cellulosics, acrylic polymers and copolymers, polycarbonates, polyacrylonitriles, ethylene-vinyl acetate copolymers, and mixtures of two or more thereof.

23. The laminate of claim 3 wherein the abrasion-resistant transparent coating layer is made from UV curable oligomers selected from the group consisting of epoxies, urethanes, polyesters and acrylics.

24. The laminate of claim 4 wherein the ink or graphics layer is derived from a water-based ink, a solvent-based ink or a radiation curable ink.

25. The laminate of claim 4 wherein the ink or graphics layer is a mono-colored or multi-colored ink layer.

26. The laminate of claim 4 wherein the ink or graphics layer is comprised of variable imprinted data.

27. The laminate of claim 5 wherein the ink or graphics layer is derived from a water-based ink, a solvent-based ink or a radiation curable ink.

28. The laminate of claim 5 wherein the ink or graphics layer is a mono-colored or multi-colored ink layer.

29. The laminate of claim 5 wherein the ink or graphics layer is comprised of variable imprinted data.

30. The laminate of claim 8 wherein the carrier sheet is comprised of paper, polymer film, or a combination thereof.

31. The laminate of claim 8 wherein the carrier sheet is comprised of a transparent thermoplastic film.

32. The laminate of claim 11 wherein the substrate is comprised of a metal, plastic, leather, paper or textile material, or combination of two or more thereof.

33. The laminate of claim 11 wherein the substrate is an automotive interior surface, hard plastic component part or consumer durable good.

34. The laminate of claim 11 wherein the substrate is a seat belt, visor, dashboard, headrest, seat back, door panel, head liner, carpet, flooring, seat cover, appliance part, motor fluid cap, engine housing, helmet, vacuum cleaner, sports equipment, livestock tag, or a lock box tag.

35. A heat-sealable laminate, comprising:

a facestock having an upper surface and a lower surface;

a heat-activatable first adhesive layer underlying the lower surface of the facestock;

a second adhesive layer overlying the upper surface of the facestock; and an adhesion promoting layer positioned between the upper surface of the facestock and the second adhesive layer.

with the proviso that the laminate is characterized by the absence of an abrasion-resistant transparent coating layer positioned between the upper surface of the facestock and the second adhesive layer.

36. A heat-sealable laminate, comprising:

a facestock having an upper surface and a lower surface;

a heat-activatable first adhesive layer underlying the lower surface of the facestock;

a second adhesive layer overlying the upper surface of the facestock; and an abrasion-resistant transparent coating layer positioned between the upper surface of the facestock and the second adhesive layer;

with the proviso that the laminate is characterized by the absence of an adhesion promoting layer positioned between the upper surface of the facestock and the second adhesive layer.

37. A heat-sealable laminate, comprising:

a facestock having an upper surface and a lower surface;

a heat-activatable first adhesive layer underlying the lower surface of the facestock;

a second adhesive layer overlying the upper surface of the facestock;

an adhesion promoting layer positioned between the upper surface of the facestock and the second adhesive layer; and an ink or graphics layer positioned between the adhesion promoting layer and the second adhesive layer;

with the proviso that the laminate is characterized by the absence of an abrasion-resistant transparent coating layer positioned between the ink or graphics layer and the second adhesive layer.

38. A heat-sealable laminate, comprising:

a facestock having an upper surface and a lower surface;

a heat-activatable first adhesive layer underlying the lower surface of the facestock;

a second adhesive layer overlying the upper surface of the facestock;

an ink or graphics layer positioned between the upper surface of the facestock and the second adhesive layer; and an abrasion-resistant transparent coating layer positioned between the ink or graphics layer and the second adhesive layer;

with the proviso that the laminate is characterized by the absence of an adhesion promoting layer positioned between the upper surface of the facestock and the second adhesive layer.

39. A heat-sealable laminate, comprising:

a facestock having an upper surface and a lower surface;

a heat-activatable first adhesive layer underlying the lower surface of the facestock;

a second adhesive layer overlying the upper surface of the facestock; and a transparent film layer having an upper surface and a lower surface, the transparent film layer underlying the second adhesive layer, and another adhesive layer adhered to the lower surface of the transparent film layer, the another adhesive layer being positioned between the transparent film layer and the upper surface of the facestock;

with the proviso that the laminate is characterized by the absence of an adhesion promoting layer positioned between the upper surface of the facestock and the second adhesive layer, wherein the second adhesive layer comprises a radiation-cured adhesive material or a removable pressure-sensitive adhesive material.

40. A heat-sealable laminate, comprising:

a facestock having an upper surface and a lower surface;

a heat-activatable first adhesive layer underlying the lower surface of the facestock;

a second adhesive layer overlying the upper surface of the facestock;

an adhesion promoting layer positioned between the upper surface of the facestock and the second adhesive layer, the adhesion promoting layer comprising a material selected from the group consisting of polyolefins, polyamides, polyesters, polyester copolymers, polyurethanes, polysulfones, polyvinylidine chloride, styrene-maleic anhydride copolymers, styrene-acrylonitrile copolymers, ionomers based on sodium orzinc salts of ethylene methacrylic acid, polymethyl methacrylates, acrylic polymers and copolymers, polycarbonates, polyacrylonitriles, ethylene-vinyl acetate copolymers, and mixtures of two or more thereof;

with the proviso that the laminate is characterized by the absence of an abrasion resistant transparent coating layer positioned between the upper surface of the facestock and the second adhesive layer, wherein the second adhesive layer comprises a radiation-cured adhesive material or a removable pressure-sensitive adhesive material.

41. A heat-sealable laminate, comprising:

a facestock having an upper surface and a lower surface, the upper surface of the facestock being corona treated;

a heat-activatable first adhesive layer underlying the lower surface of the facestock; and a second adhesive layer overlying the upper surface of the facestock;

an adhesion promoting layer positioned between the upper surface of the facestock and the second adhesive layer;

with the proviso that the laminate is characterized by the absence of an abrasion-resistant transparent coating layer positioned between the upper surface of the facestock and the second adhesive layer.

42. A heat-sealable laminate, comprising:

a facestock having an upper surface and a lower surface, the upper surface of the facestock being corona treated;

a heat-activatable first adhesive layer underlying the lower surface of the facestock; and a second adhesive layer overlying the upper surface of the facestock;

an abrasion resistant transparent coating layer positioned between the upper surface of the facestock and the second adhesive layer;

with the proviso that the laminate is characterized by the absence of an adhesion promoting layer positioned between the upper surface of the facestock and the second adhesive layer.

43. A heat-sealable laminate, comprising:

a facestock having an upper surface and a lower surface;

a heat-activatable first adhesive layer underlying the lower surface of the facestock; and a second adhesive layer overlying the upper surface of the facestock;

with the proviso that the laminate is characterized by the absence of either an adhesion promoting layer or an abrasion-resistant transparent coating layer positioned between the upper surface of the facestock and the second adhesive layer, wherein the second adhesive layer comprises a radiation-cured adhesive material which remains adhered to the layer underlying it and functions as an additional protective layer.

* * * * *